Sept. 4, 1923.
A. A. SHARE
1,467,252
CRUMB GATHERER
Filed July 23, 1921
2 Sheets-Sheet 1
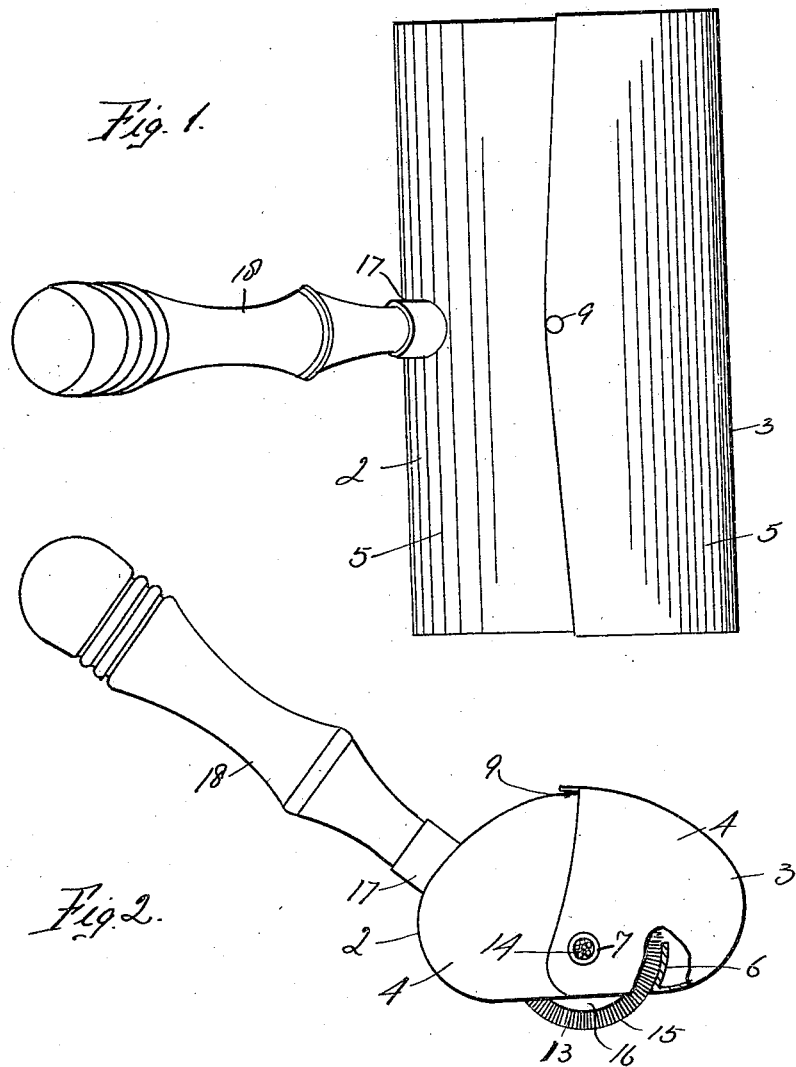
INVENTOR
Arthur A. Share
By W. W. Williamson Atty.

Sept. 4, 1923.   1,467,252
A. A. SHARE
CRUMB GATHERER
Filed July 23, 1921   2 Sheets-Sheet 2
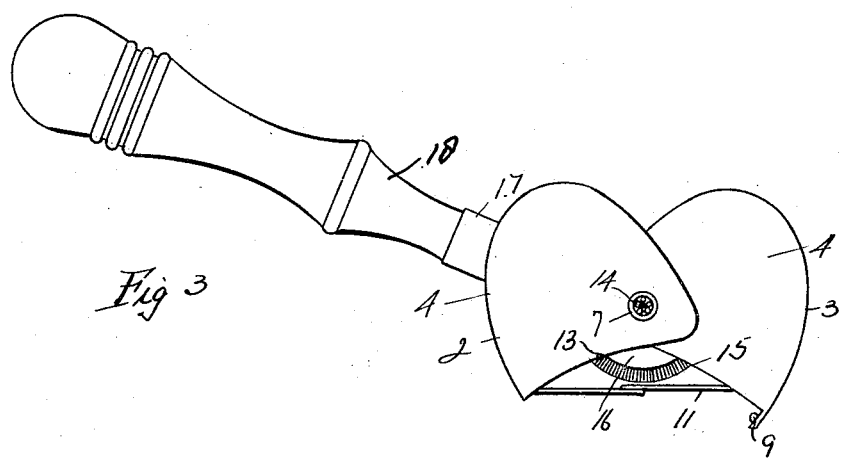
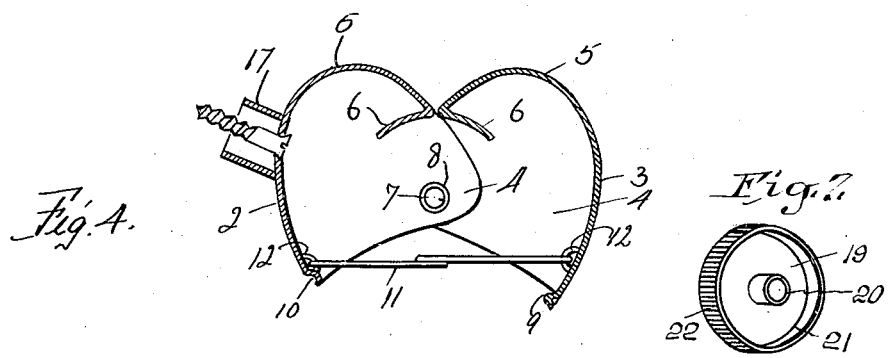
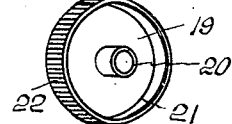
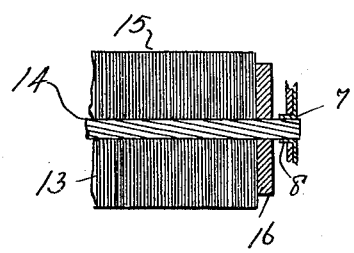
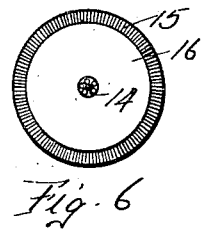
INVENTOR
Arthur A. Share
By W. W. Williamson Atty.

Patented Sept. 4, 1923.

1,467,252

UNITED STATES PATENT OFFICE.

ARTHUR A. SHARE, OF PHILADELPHIA, PENNSYLVANIA.

CRUMB GATHERER.

Application filed July 23, 1921. Serial No. 486,937.

*To all whom it may concern:*

Be it known that I, ARTHUR A. SHARE, a citizen of the United States, residing at Philadelphia, in the county of Philadelphia and State of Pennsylvania, have invented new and useful Improvements in a Crumb Gatherer, of which the following is a specification.

My invention relates to new and useful improvements in a crumb gatherer, and has for its object to provide two co-operating body members pivoted to each other and adapted to be held in a closed position against the tension of a suitable spring to provide a crumb receptacle and to revolubly mount a brush within said body members which is adapted to push up crumbs and convey the same to the interior of the receptacle where they are dislodged from the brush by means of suitable internal flanges formed with the body members.

Another object of the invention is to provide a device of this character which will be exceedingly simple in construction, relatively inexpensive in the cost of manufacture, compact and of light weight though strong and durable.

Another object of the invention is to provide a unique construction of trunnion for pivoting the body members together and also acting as bearings for the core or axle of the revoluble brush.

A further object of the invention is to provide an exceedingly simple and effective means for holding the body members in a closed position.

A still further object of the invention is to provide means for moving the body members into an open position when the elements of the aforementioned locking means are disengaged.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application in which:—

Fig. 1, is a plan view of a crumb gatherer made in accordance with my invention.

Fig. 2, is an end view thereof with a portion of one of the body members broken away and shown in section to clearly illustrate a part of the interior construction.

Fig. 3, is a similar view in an open position as when crumbs are to be removed therefrom.

Fig. 4, is a transverse sectional view thereof in its open position with the brush handle removed.

Fig. 5, is a fragmentary detail sectional view of the brush and one of the end walls of the coacting body members, the core or axle of the brush being shown in elevation.

Fig. 6, is an end view of the brush.

Fig. 7, is a perspective of a modified form of one of the tractor wheels.

In carrying out my invention as here embodied, 2 and 3 represent a pair of coacting body members each consisting of a pair of end walls 4 and a side wall 5, said side walls running from a point approximately in the vertical center of the device, when closed, to points on either side of said vertical center beneath the device leaving a space for the projection of the bristles of the brush to be hereinafter described and the adjacent lower edges of these side walls project inwardly to form arcuate flanges 6 which act as means to dislodge crumbs as will be presently mentioned.

The end walls of one of the body members as those of the body member 3 are each provided with a hollow trunnion 7 which may be constructed in any suitable manner the same being here shown as short sections of tube mounted in holes in the end walls, and these trunnions register with holes 8 in the end walls of the other body thereby pivoting said body members together which will permit said body members to be opened as shown in Figs. 3 and 4 or to be moved to a closed position, as shown in Figs. 1 and 2 and when in the closed position they are there held by suitable fastening means or devices, the means here shown consisting of a projection 9 formed from the side wall of one of the body members which coacts or registers with a recess 10 produced in the side wall of the other body member, said projection and recess being formed adjacent the edges of their respective body members. When the aforementioned fastening devices are disengaged from each other the body members will be moved into an open position by means of a suitable spring 11, in other words the normally coacting portions of the body members will be forced apart and when inverted as shown in Figs. 3 and 4 the contents of said body members may be removed or caused to fall therefrom and the ends of said spring are preferably fastened to staples 12 secured in some suitable manner to the interior of said body members.

A brush 13 preferably consisting of a coiled wire core or axle 14 and bristles 15 interwoven in the coils of said wire core is revolubly mounted within the body members by placing the ends of said core or axle 14 in the hollow trunnions 7, the bristles of said brush projecting through the space between the lower ends of the side walls of the body members when in a closed position and the diameter of said brush is slightly greater than the distance between the inturned flanges 6 when the body members are in their operative position so that as the brush is revolved the bristles thereof will scrape along the inner edge of one of the flanges whereby any crumbs or other foreign matter entangled in the bristles of the brush will be dislodged therefrom and in order to revolve said brush when the crumb gatherer is moved over a surface I provide a wheel 16 at each end of the brush which are fixed in any suitable manner to the ends of the core or axle and these wheels are located within the body members. These wheels are of less diameter than the brush as plainly shown in Fig. 5 so that during the propulsion of the crumb gatherer over a surface the bristles of the brush will be flexed thereby assisting in gathering or entangling crumbs or other foreign matter over which the device happens to run.

One of the body members carries a socket 17 in which is fastened a suitable handle 18 of any desired length, size or configuration whereby the crumb gatherer may be propelled over a surface, lifted and inverted as occasion requires, and a screw 18ª secured centrally within said socket may be utilized to further secure the handle in place.

In practice the body members are fastened in their closed or operative position as shown in Figs. 1 and 2 then by taking hold of the handle 18 and moving the device over a surface with a slight pressure thereon the brush bristles will be flexed and the wheels 16 caused to engage said surface, then by moving the crumb gatherer over said surface the brush will be revolved and any crumbs or other foreign matter in the path of travel of the crumb gatherer will be picked up by or entangled in the bristles of the brush and carried thereby into the chamber formed by said body member where the crumbs will be dislodged from the brush by means of one of the inwardly projecting flanges 6 causing the crumbs to drop down behind said flange where they will be retained until the crumb gathering operation is completed. It is to be understood that the inwardly projecting flanges 6 are formed in the arc of a circle concentric with the trunnions 7 or the axle of the brush and are so spaced that the distance between them is slightly less than the diameter of the brush so that the bristles thereof will be flexed as they contact with the edge of either of said flanges.

When the crumb gathering operation has been completed the projection 9 is disengaged from the recess 10 by pressing upon the side wall of one of the body members, it being understood that said side walls are of sufficient resiliency to permit one to be forced a slight distance from the other, at which time the spring 11 will open the body members or rotate them about the axle of the brush after which the crumb gatherer may be inverted as shown in Figs. 3 and 4 which will cause the crumbs to fall therefrom and when all of said crumbs have been removed the body members may be again moved into their closed position against the action of said spring or locked together by means of the fastening devices 9 and 10 at which time said crumb gatherer is again ready for use.

In lieu of the wheels 16 ones stamped from thin metal as shown in Fig. 7 may be used, such wheels each comprising a web 19 having an integral hub 20 and an integral flange-like rim 21 the exterior surface of which is roughened as at 22.

The brush axle 14 is shown as made of coiled wires in Fig. 5 where it is illustrated in elevation but to bring this out more plainly and relieve the drawing of any vagueness small circles will be added to the end of said axle in Figs. 2, 3 and 6.

Of course I do not wish to be limited to the exact details of construction as herein shown as these may be varied within the limits of the appended claims without departing from the spirit of my invention.

Having thus fully described my invention, what I claim as new and useful is:—

1. A crumb gatherer consisting of two body members, one of said body members having holes therethrough, hollow trunnions carried by the other member and registering with the aforementioned holes to pivot said members together and a brush including an axle the ends of the latter being journalled in said trunnions.

2. A crumb gatherer consisting of two body members, one of said body members having holes therethrough, hollow trunnions carried by the other member and registering with the aforementioned holes to pivot said members together, a brush including an axle the ends of the latter being journalled in said trunnions, means for holding said body members in an operative position, and means for moving said body members into an inoperative position when said holding means is disengaged.

3. In a device of the character described, two complementary body members pivoted together and provided with means to hold them in an operative position, the lower portions of said members being spaced apart and a brush journalled axially of said pivot points.

4. In a device of the character described, two body members pivoted together and provided with means to hold them in an operative position, the lower portions of said members being spaced apart, a brush journalled axially of said pivot points, and an inwardly projecting crumb dislodging flange formed with each body member, arcuate in cross section and arranged concentric to the pivot points of the body member.

5. A device of the character mentioned consisting of two body members each including end walls and a side wall, the end walls of one of said members having holes therein, hollow trunnions carried by the end walls of the other member and registering with said holes to pivot said members together, the side wall of one of said members having a recess produced therein adjacent one of its edges, a projection formed from the side wall of the other member to register with said recess for holding said members in operative position, the lower portions of said side walls being spaced apart when the body members are in operative position, a spring attached to said members for moving them into an inoperative position when the holding means is disengaged, an arcuate inwardly projecting flange formed from the lower edge of the side wall of each body member and concentric to the hollow trunnions, a brush having an axle, the ends of said axle being journalled in the hollow trunnions with a portion of the brush projecting between the spaced lower parts of the body members, the diameter of said brush being greater than the space between the body members and the inwardly projecting flanges whereby the bristles of said brush will be flexed as they engage said flanges, wheels on said brush axle, said wheels being of less diameter than the brush whereby the bristles of said brush will be flexed when the wheels are brought into engagement with a surface to be cleaned by the device, a socket carried by one of the body members and a handle mounted in said socket whereby the device may be moved over a surface.

6. A crumb gatherer comprising, in combination, a brush having an axle and two complementary body members pivoted to each other about the ends of said axle.

7. A crumb gatherer comprising in combination, a brush provided with an axle, two complementary body members, means for pivoting said body members together, said pivoting means being utilized as the journals for the ends of the axle and resilient means attached only to said body members for normally maintaining them in operative position.

In testimony whereof, I have hereunto affixed my signature.

ARTHUR A. SHARE.